(12) United States Patent
Chitrapu et al.

(10) Patent No.: US 11,395,357 B2
(45) Date of Patent: *Jul. 19, 2022

(54) TRUST MODE SWITCHING FOR WIRELESS ACCESS POINTS

(71) Applicant: AT&T Mobility II LLC, Atlanta, GA (US)

(72) Inventors: Prabhakar Chitrapu, Blue Bell, PA (US); Jayesh Sukumaran, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,560

(22) Filed: Aug. 31, 2020

(65) Prior Publication Data

US 2020/0396781 A1    Dec. 17, 2020

Related U.S. Application Data

(63) Continuation of application No. 15/364,833, filed on Nov. 30, 2016, now Pat. No. 10,764,944.

(51) Int. Cl.
*H04W 76/12* (2018.01)
*H04W 76/19* (2018.01)
(Continued)

(52) U.S. Cl.
CPC ......... *H04W 76/12* (2018.02); *H04L 63/0272* (2013.01); *H04L 63/164* (2013.01);
(Continued)

(58) Field of Classification Search
CPC .................. H04L 63/164; H04L 63/0272
See application file for complete search history.

(56) References Cited

U.S. PATENT DOCUMENTS

| 8,682,243 B2 | 3/2014 | Bienas et al. |
| 8,792,453 B2 | 7/2014 | Bachmann et al. |

(Continued)

OTHER PUBLICATIONS

Norell, Lennart "Wi-Fi calling-extending the Reach of VoLTE to Wi-Fi", dated 2015. pp. 1-7.
(Continued)

*Primary Examiner* — Jinsong Hu
*Assistant Examiner* — Farideh Madani (57) ABSTRACT

Devices, computer-readable media, and methods are disclosed for establishing a secure tunnel having a path that includes an untrusted link between a wireless access point and a gateway device. For example, a processor may detect a security event associated with a wireless access point that is in communication with a gateway device of the telecommunication network via a trusted link, establish a secure tunnel between the gateway device and an endpoint device that is accessing the telecommunication network via the wireless access point and the gateway device, and transport payload traffic between the endpoint device and the gateway device via the secure tunnel. A path of the secure tunnel may include an untrusted link between the wireless access point and the gateway device. In addition, the payload traffic that is transported via the secure tunnel may be indecipherable by the wireless access point.

20 Claims, 3 Drawing Sheets

(51) Int. Cl.

| | |
|---|---|
| *H04W 12/102* | (2021.01) |
| *H04W 12/08* | (2021.01) |
| *H04L 9/40* | (2022.01) |
| *H04W 12/00* | (2021.01) |
| *H04W 12/033* | (2021.01) |
| *H04W 88/08* | (2009.01) |
| *H04W 88/16* | (2009.01) |

(52) U.S. Cl.
CPC ......... *H04W 12/00* (2013.01); *H04W 12/033* (2021.01); *H04W 12/08* (2013.01); *H04W 12/102* (2021.01); *H04W 76/19* (2018.02); *H04W 88/08* (2013.01); *H04W 88/16* (2013.01)

(56) References Cited

U.S. PATENT DOCUMENTS

| | | |
|---|---|---|
| 8,856,910 B1* | 10/2014 | Rostami-Hesarsorkh ................... G06F 21/554 726/11 |
| 9,408,078 B2 | 8/2016 | Basavaraj et al. |
| 9,414,354 B2 | 8/2016 | Dhammawat et al. |
| 9,420,045 B2 | 8/2016 | Marmolejo-Meillon et al. |
| 2011/0030039 A1 | 2/2011 | Bilange |
| 2011/0261787 A1* | 10/2011 | Bachmann ........... H04W 12/037 370/331 |
| 2012/0096263 A1* | 4/2012 | Shi ......................... H04W 12/02 713/168 |
| 2012/0331545 A1 | 12/2012 | Baliga |
| 2013/0040657 A1* | 2/2013 | Jackson ................. G06F 21/84 455/456.1 |
| 2013/0097418 A1 | 4/2013 | Bhatt et al. |
| 2013/0097674 A1 | 4/2013 | Jindal et al. |
| 2014/0059351 A1* | 2/2014 | Braskich ................. G06F 21/36 713/171 |
| 2014/0198718 A1* | 7/2014 | Billau ..................... H04W 28/12 370/328 |
| 2015/0341358 A1 | 11/2015 | Borovikov et al. |
| 2016/0014159 A1 | 1/2016 | Schrecker |
| 2016/0183085 A1 | 6/2016 | Yerrabommanahalli et al. |
| 2017/0111792 A1* | 4/2017 | Correia Fernandes ..................... H04L 63/0272 |
| 2018/0098265 A1* | 4/2018 | Tomici .................. H04W 36/26 |

OTHER PUBLICATIONS

Rayment, Stephen "Archieving Carrier-Grade Wi-Fi in the 3GPP World", dated 2012. pp. 1-6.
"Aptilo in 3GPP Wi-Fi Access" dated Oct. 13, 2016. pp. 1-5.

* cited by examiner

TRUST MODE SWITCHING FOR WIRELESS ACCESS POINTS

This application is a continuation of U.S. patent application Ser. No. 15/364,833, filed on Nov. 30, 2016, now U.S. Pat. No. 10,764,944, which is herein incorporated by reference in its entirety.

The present disclosure relates generally to endpoint device and telecommunication network security, and more particularly to devices, computer-readable media and methods for establishing a secure tunnel having a path that includes an untrusted link between a wireless access point and a gateway device.

BACKGROUND

Small cells and wireless access points are expected to play an increasing role in Fifth Generation (5G) networks. However, wireless access points and small cells may be deployed at customer premises, and may therefore be more vulnerable to tampering and similar communication security breaches.

SUMMARY

Devices, computer-readable media, and methods are disclosed for establishing a secure tunnel having a path that includes an untrusted link between a wireless access point and a gateway device. For example, a processor may detect a security event associated with a wireless access point that is in communication with a gateway device of the telecommunication network via a trusted link. The processor may then establish a secure tunnel between the gateway device and an endpoint device that is accessing the telecommunication network via the wireless access point and the gateway device, and transport payload traffic between the endpoint device and the gateway device via the secure tunnel. A path of the secure tunnel may include an untrusted link between the wireless access point and the gateway device. In addition, the payload traffic that is transported via the secure tunnel may be indecipherable by the wireless access point.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for establishing a secure tunnel having a path that includes an untrusted link between a wireless access point and a gateway device, e.g., in response to a security event associated with the wireless access point. For example, wireless access points (WAPs) such as Wi-Fi access points and small cells, such as home eNodeBs, are often deployed at the customer premises, and are therefore vulnerable to tampering and similar communication security breaches. In extreme cases of compromise, a WAP could be turned off, eliminating all communications. However, this assumes that the customer/subscriber is capable of detecting a security breach and disabling the WAP, or that the WAP is under the control of the telecommunication service provider. In addition, endpoint devices using the WAP are entirely unable to access a telecommunication service provider network when the WAP is disabled unless a different access network is within communication range.

In accordance with the present disclosure, a telecommunication service provider network may initially communicate with a WAP via a trusted link. However, if a security event associated with the WAP is detected, communication with the WAP may be switched to an untrusted link. In addition, the telecommunication service provider network may establish secure tunnels, e.g., Internet Protocol security (IPsec) tunnels, with endpoint devices that access the telecommunication service provider network via the WAP. Thus, rather than taking the WAP out of service, the WAP is instead switched to an untrusted mode of communication. In particular, the WAP acts as a transparent relay for the secure communications between the endpoint device and the telecommunication service provider network.

In one example, all services offered by the telecommunication service provider network may continue to be provided (from the endpoint device perspective). In another example, one or more services may be denied to endpoint devices connecting to the telecommunication service provider network via the untrusted link. In one example, when the security event is resolved, a trusted link with the WAP may be reestablished and traffic for endpoint devices connected to the WAP may be transitioned back to the trusted link. These and other aspects of the present disclosure are discussed in greater detail below in connection with the examples of FIGS. 1-3.

Figure 1:
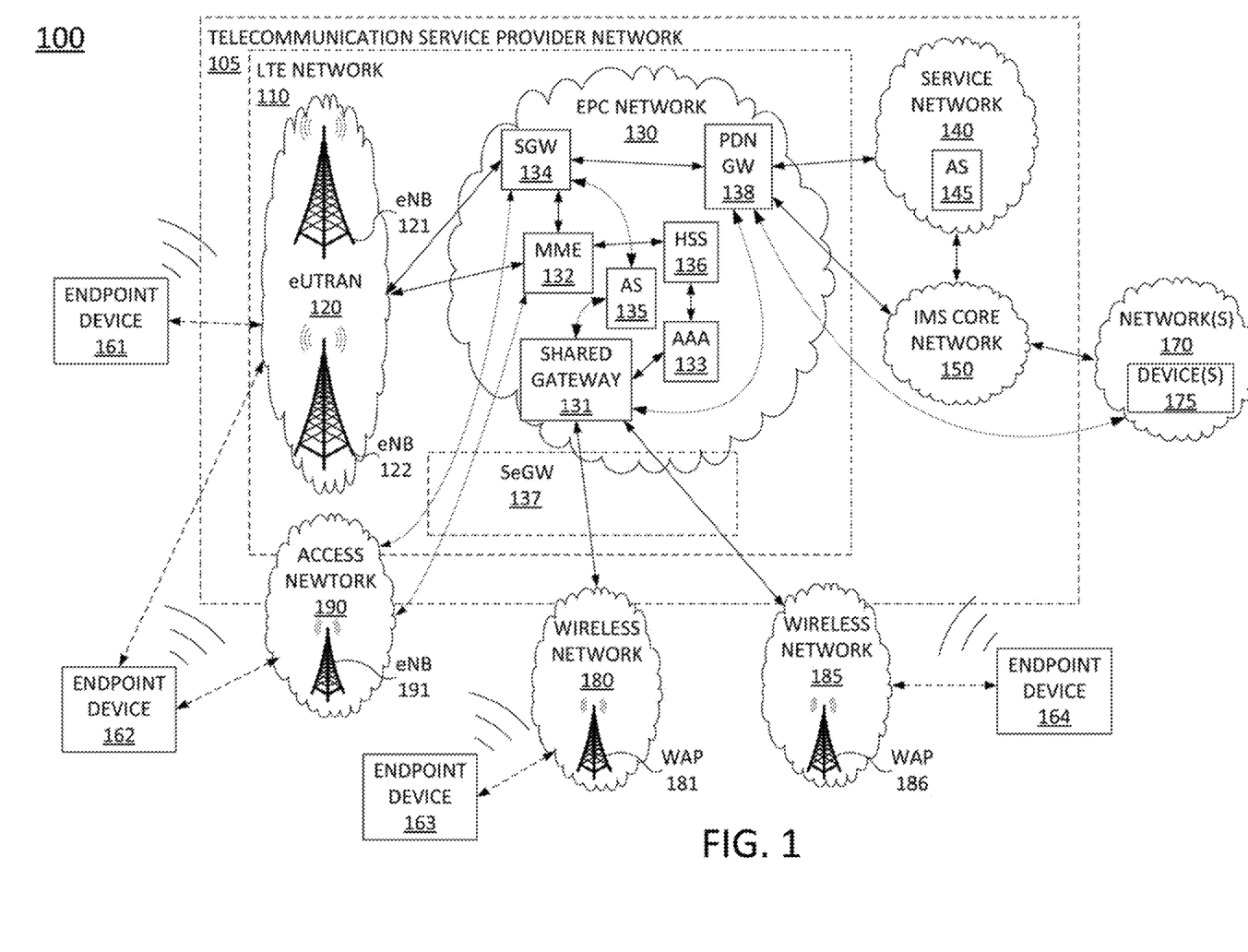
FIG. 1 illustrates an example system related to the present disclosure.

To better understand the present disclosure, FIG. 1 illustrates an example network, or system 100 that may implement embodiments of the present disclosure for establishing a secure tunnel having a path that includes an untrusted link between a wireless access point and a gateway device. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint devices 161-164 with each other and with the application server (AS) 145 in service network 140, with devices 175 in networks 170, and/or with other components of telecommunication service provider network 105. The endpoint devices 161-164 may each comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). In one example, the endpoint devices 161-164 may each comprise a device of a subscriber or customer of the telecommunication service provider network 105.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint devices 161 and 162, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint devices 161-164. HSS 136 may also maintain and provide information about subscribers' locations. In one example, Authentication, Authorization, and/or Accounting (AAA) server 133 obtains subscriber profile information from HSS 136 to authenticate and authorize endpoint devices to connect to EPC network 130 via Institute for Electrical and Electronics Engineers (IEEE) 802.11 (Wi-Fi)/non-3GPP access networks. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW. In one example, system 100 may also include an application server (AS) 135. In one example, application server 135 may comprise a device, such as computing system 300 depicted in FIG. 3, specifically configured to provide one or more functions for establishing a secure tunnel having a path that includes an untrusted link between a wireless access point and a gateway device, in accordance with the present disclosure.

In one example, service network 140 may comprise one or more devices, such as application server (AS) 145 for providing services to subscribers, customers, and or users. For example, telecommunication service provider network 105 may provide a cloud storage service, web server hosting, and other services. As such, service network 140 may represent aspects of telecommunication service provider network 105 where infrastructure for supporting such services may be deployed. In one example, AS 145 may comprise a computing system, such as computing system 300 depicted in FIG. 3, specifically configured to provide one or more service functions, in accordance with the present disclosure. Although a single application server, AS 145, is illustrated in service network 140, it should be understood that service network 140 may include any number of components to support one or more services that may be provided to one or more subscribers, customers, or users by the telecommunication service provider network 105. As used herein, the terms "instantiate," "configure," and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general. Devices 175 may include servers, such as web servers, storage devices, enterprise servers, email servers, and so forth. Devices 175 may also include personal computers, desktop computers, laptop computers, personal digital assistants (PDAs), tablet computing devices, or any other devices for wireless and/or wired communications. In one example, endpoint devices 161-164 may communicate with devices 175 in networks 170 via PDN GW 138 and/or via PDN GW 138 and IMS core network 150, e.g., for voice over LTE (VoLTE)-based calls or Wi-Fi calling.

In one example, system 100 may also include an access network 190 with an eNodeB (eNB) 191. The eNodeB 191 may comprise, for example, a home eNodeB (HeNB), a "small cell," such as a femtocell, a microcell, etc., and/or a "low power" eNodeB. For instance, eNB 191 may have a range of 2 kilometers or less, while eNodeBs 121 and 122 may have a range of up to 35 kilometers or more. In one example, access network 190 and eNB 191 may connect to EPC network 130 via a subscriber/customer broadband connection. For instance, access network 190 may comprise a home network of a customer/subscriber and eNodeB 191 may connect via a home gateway (not shown) or similar equipment deployed at the customer premises to SGW 134 and MME 132 in EPC network 130, e.g., via S1 interfaces. While access network 190 may comprise a home network, eNodeB 191 may continue to be managed by a telecommunication service provider network 105 or may be managed by a customer/subscriber associated with access network 190. In another example, access network 190 and eNodeB 191 may be controlled and/or managed by telecommunication service provider network 105. In other words, access network 190 and eNodeB 191 may be part of telecommunication service provider network 105 and/or LTE network 110. For instance, an operator of telecommunication service provider network 105 may add access network 190 and eNodeB 115 as a small cell, picocell, femtocell, or the like to fill gaps in coverage of macro-cells or to temporarily support larger numbers of endpoint devices in an area, e.g., at a concert, sporting event, or other large gathering. In still another example, access network 190 may comprise a portion of a peer network, e.g., of a different telecommunication service provider.

In one example, access network 190 and eNodeB 191 may further connect to SGW 134 and MME 132 via a security gateway (SeGW) 137. SeGW 137 may provide an anchor point for secure communications between eNodeB 191 and EPC network 130. In particular, since access network 190 may comprise a customer premises, it may be more vulnerable to attack and compromise, and may provide a vector for entry into telecommunication service provider network 105 and EPC network 130. Thus, in one example, SeGW 137 may establish an IP security (IPsec) tunnel between itself and the eNodeB 191. The SeGW 137 may comprise a firewall or perform similar functions to analyze and filter traffic from eNodeB 191 before passing the traffic to SGW 134 or MME 132, or alternatively dropping the traffic or passing the traffic to a quarantine device or other network based device, e.g., for further analysis, malicious traffic signature generation, and so forth.

In one example, EPC network 130 may also include a shared gateway 131. In one example, shared gateway 131 may comprise an evolved packet data gateway (ePDG), a trusted wireless local area network (WLAN) authentication, authorization, and accounting (AAA) proxy (TWAP), and a trusted WLAN access gateway (TWAG). In other words, shared gateway 131 may comprise a device that is configured to provide functions of all of an ePDG, a TWAP and a TWAG. In one example, ePDG functionality of the shared gateway 131 may process traffic from endpoint devices accessing the EPC network 130 via untrusted wireless networks (e.g., IEEE 802.11/Wi-Fi networks), while TWAP/TWAG functionality of shared gateway 141 may process traffic from endpoint devices accessing the EPC network via trusted wireless networks (e.g., IEEE 802.11/Wi-Fi networks).

For example, wireless access point (WAP) 181, in wireless network 180 may comprise an untrusted WAP. Thus, wireless network 180 may comprise an untrusted wireless network. In one example, WAP 181, e.g., a wireless router that may communicate with endpoint device 163 via an IEEE 802.11/Wi-Fi based link, connects to shared gateway 131 via an S2b interface. In addition, in one example, endpoint device 163 may be connected to shared gateway 131 via a secure tunnel, e.g., an IPsec tunnel, wherein traffic carried via the secure tunnel is passed via the WAP 181, but is indecipherable to the WAP 181. For example, the payload data may be encrypted using an encryption key, or keys, which may be held by endpoint device 162 and shared gateway 131, but which WAP 181 does not possess. In one example, the secure tunnel between the endpoint device 162 and shared gateway 131 may comprise a SWu interface. On the other hand, WAP 186 (e.g., another wireless router) in wireless network 185 may comprise a trusted WAP. Thus, wireless network 185 may comprise a trusted wireless access network. In one example, WAP 186 connects to shared gateway 131 via an S2a interface. For instance, the link between WAP 186 and shared gateway 131 may also comprise an IPsec tunnel. However, it should be noted that the IPsec tunnel terminates at WAP 186 and not at the endpoint device 164, in contrast to the untrusted wireless network 180 and untrusted WAP 181, where a secure tunnel is established between the shared gateway 131 and endpoint device 163.

Wireless networks and WAPs may be designated as "trusted" or "untrusted" based upon several factors, such as whether the wireless network is a customer or subscriber network, or a peer network, e.g., of a different telecommunication service provider, based upon a model or type of WAP, and so forth. For instance, WAP 186 and wireless network 185 may be trusted insofar as wireless network 185 (and WAP 186) may be controlled and/or operated by the same operator of telecommunication service provider network 105. In another example, wireless network 185 and WAP 186 may be trusted when wireless network 185 (and WAP 186) are controlled and/or operated by an entity that is of a certain size or that has committed to a certain level of security, e.g., a large organization with multiple employees dedicated to network security. For instance, wireless network 185 may be operated by a large entity, such as a national bank, a large chain retailer, or the like that is a customer/subscriber of the telecommunication service provider network 105. In another example, wireless network 185 may be operated by a peer telecommunication service provider that may dedicate a same or a similar level of resources to communication infrastructure and information security as telecommunication service provider network 105. In one example, wireless network 180 and WAP 181 may be untrusted insofar as wireless network 180 may comprise a home network of a subscriber of telecommunication service provider network 105. For instance, communication equipment at a residential customer premises may, in general, be more susceptible to tampering and other types of information security breaches as compared to communication infrastructure that is under the control of an operator of telecommunication service provider network 105.

In one example, one or both of wireless networks 180 and 185 may further be connected to shared gateway 131 via SeGW 137. For instance, in one example, SeGW 137 may serve as an anchor point for secure communications between EPC network 130 and external devices. Thus, in another example, a secure tunnel (e.g., an IPsec tunnel) may be established between WAP 186 and SeGW 137, e.g., instead of a secure tunnel being established between trusted WAP 186 and shared gateway 131. Similarly, a secure tunnel may be established between endpoint device 163 and SeGW 137, e.g., instead of a secure tunnel between endpoint device 164 and shared gateway 131. It should be noted that SeGW 137 may comprise a component of EPC network 130, or may comprise a component of LTE network 110 that is considered to be external to the EPC network 130.

In accordance with the present disclosure, certain access networks and wireless access points may be designated by telecommunication service provider network 105 as "trusted" for a general mode of operation, while other wireless access points and access networks may be designated as "untrusted." As referred to herein, a wireless access point (WAP) may include both eNodeBs, e.g., HeNBs, small cells, picocells, and the like, as well as wireless routers. In one example, AS 135 may store records containing trust designations (or "trust modes") for various wireless access points and/or access networks which may be retrieved by SGW 134, MME 132, shared gateway 131, and/or SeGW 137. In another example, trust designations may be stored as records within HSS 136, shared gateway 131, and/or SeGW 137. In one example, SGW 134, MME 132, shared gateway 131 and/or SeGW 137 may refer decisions to AS 135 as to which connections should be permitted to EPC network 130, e.g., from wireless access networks/WAPs, and how such connections should be established, e.g., trusted or untrusted links. Alternatively, or in addition, SGW 134, MME 132, shared gateway 131 and/or SeGW 137 may make decisions regarding which connections with EPC network 130 should be allowed for various endpoint devices, including endpoint devices 161-164, based upon subscriber profile information from AAA server 133.

In addition, in one example, a trust designation of a WAP or wireless access network may be changed, e.g., from "trusted" to "untrusted," based upon various events, such as an invalidity of a security certificate of a WAP, a detection of a port opening at the WAP, and so forth. In another example, a security event may comprise a detection of a physical tampering at the WAP. For instance, sensors inside the WAP may detect when a housing of the WAP has been opened, or when the WAP has been subjected to an external force that could affect the circuitry inside. In another example, a tampering may be detected at a trusted platform module (TPM) inside the WAP that holds certain security chips. To illustrate, wireless network 185 and WAP 186 may be "trusted" and may be providing connectivity between endpoint device 164 and EPC network 130. In one example, WAP 186 may process traffic to and from endpoint device 164 via a trusted link, e.g., an S2a interface with SeGW 137 or shared gateway 131. In one example, the trusted link may comprise an IPsec tunnel with the WAP 186 as a first termination point and the SeBW 137 or shared gateway 131 as a second termination point of the IPsec tunnel.

In addition, in one example, the telecommunication service provider network 105 may receive monitoring data from WAP 186 via the trusted link, i.e., when the wireless network 105 and/or WAP 186 have a trust designation of "trusted." In one example, the monitoring data comprises at least one of: operations data, administration data, management data and/or maintenance data (OA&M data). In particular, it may be advantageous to have a trusted link with WAP 186 to permit components of EPC network 130 to manage aspects of WAP 186, to load balance traffic within EPC network 130 based at least in part upon the monitoring data from WAP 186, and so forth. In addition, there may be less links, e.g., IPsec tunnels, for traffic entering and leaving EPC network 130 as compared to having secure tunnels terminating at each and every endpoint device. A similar rationale exists with respect to access network 190 insofar as it is common for HeNBs and femtocells to be deployed at a customer premises, but remain managed and administered by the telecommunication service provider. For example, a customer/subscriber may notify the telecommunication service provider in advance of devices which should be authorized and permitted to connect via a femtocell, where the telecommunication service provider may then provision and maintain an access control list within the femtocell. It should be noted that EPC network 130 may still authenticate and authorize endpoint device 164 prior to conveying payload traffic for the endpoint device 164. However, the trusted link between WAP 186 and SeGW 137 or shared gateway 131 may already be established based upon the trust designation of the wireless network 185 and/or WAP 186.

In one example, it may be detected, e.g., by shared gateway 131, SeGW 137 and/or AS 135, that a security certificate of WAP 186 has expired. For instance, the trusted link may comprise an IPsec tunnel secured via Internet Key Exchange (IKE), e.g., IKE version 2, or the like. A key, e.g., a security certificate, for the WAP 186 may have a designated expiration date and time after which the key is no longer valid. Upon the detection of this event, and if no updated key is provided, the network component at the other end of the secure link, e.g., the SeGW 137 or shared gateway 131, may then cause the trust designation of the WAP 186 and/or wireless network 185 to be changed to "untrusted". For instance, the record storing the trust designation may be updated on whichever network-based device stores such record.

In addition, SeGW 137 or shared gateway 131 may establish an untrusted link between the SeGW 137 or shared gateway 131 and the WAP 186 in response to the detection of the expiration of the security certificate of WAP 186. The untrusted link may comprise a Sb interface, for example. In addition, SeGW 137 or shared gateway 131 may release the trusted link, while remaining in communication with WAP 186 via the untrusted link. In one example, SeGW 137 or shared gateway 131 may further establish a secure tunnel with endpoint device 164, and transport payload traffic for the endpoint device 164 via the secure tunnel. As referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the system 100. In addition, the term "payload traffic" may refer to application layer data (e.g., according to the TCP/IP reference model) which may be encapsulated for transmission via the one or more networks with one or more headers utilized by the network interface layer, the Internet layer, etc.

In one example a path of the secure tunnel includes the untrusted link between the WAP 186 and the SeGW 137 or shared gateway 131. Notably, the payload traffic that is transported via the secure tunnel is indecipherable by the WAP 186 even though the WAP 186 remains in the path of the secure tunnel. In one example, the secure tunnel may also comprise an IPsec tunnel that is similar to the trusted link that was previously established between WAP 186 and SeGW 137 or shared gateway 131, albeit with a termination point at the endpoint device 164. In addition, in one example, the secure tunnel may comprise a SWu interface. It should be noted that in one example, SeGW 137 or shared gateway 131 may perform the above described functions based upon instructions executed locally on such devices. However, in another example, SeGW 137 and/or shared gateway 131 may perform such functions under the instructions of AS 135. In other words, AS 135 may detect a security event associated with WAP 186 and/or wireless network 185, and send instructions to SeGW 137 or shared gateway 131 to establish an untrusted link with WAP 186, to establish a secure tunnel with endpoint device 165, and so forth.

In one example, at least one service provided by the telecommunication service provider network 105 to the endpoint device 164 is made unavailable when the secure tunnel is established with the endpoint device 165, i.e., when the wireless network 185 and/or WAP 186 are "untrusted." For example, SeGW 137, shared gateway 131 and/or AS 135 may send an instruction to PDN GW 138 to deny access to a service provided via AS 145 in service network 140, a service provided via IMS core network 150, e.g., VoLTE, and so forth. However, in another example, services previously available to endpoint device 164 from telecommunication service provider network 105 may remain available. In particular, although wireless network 185 and/or WAP 186 may be "untrusted," the secure tunnel between endpoint device 164 and SeGW 137 or shared gateway 131 permits payload traffic to be carried for endpoint device 164 that is indecipherable to the WAP 186 while in transit. In addition, the secure tunnel may be considered "secure" from the perspective of the telecommunication service provider network 105 insofar as the endpoint device 164 may be authenticated and authorized by AAA server 133 based upon credentials stored on the endpoint device 164. As such, a full suite of services may remain available to the endpoint device 164 in such a scenario, e.g., the discretion of the operator of telecommunication service provider network 105.

In one example, AS 135, or another component of EPC network 130 or LTE network 110 may detect a resolution of the security event and may cause the trusted link to be reestablished between SeGW 137 or shared gateway 131 and WAP 186. For instance, AS 135 may send an additional instruction to SeGW 137 or shared gateway 131 to reestablish the trusted link and to switch traffic for WAP 186 and wireless network 185 back to the trusted link. In one example, at least one service of the telecommunication service provider network 105 that is made unavailable to the endpoint device 164 when the secure tunnel is established is again provided or made available to the endpoint device 164 when the trusted link is reestablished. For instance, SeGW 137, shared gateway 131 and/or AS 135 may send an instruction to PDN GW 138 to permit access by endpoint device 164 to a service provided via AS 145 in service network 140, a service provided via IMS core network 150, and so forth. In addition, the untrusted link and the secure tunnel terminating at endpoint device 164 may also be released.

It should be noted that a similar process may be followed with respect to other endpoint devices that may connect to telecommunication service provider network 105 via WAP 186 and wireless network 185. For instance, if wireless network 185 and/or WAP 186 becomes "untrusted," additional secure tunnels may be established that terminate on other endpoint devices connecting via WAP 186 and wireless network 185, where each of the secure tunnels may be aggregated over an untrusted link, e.g., an S2b interface, between WAP 186 and one of the components in EPC network 130. It should also be noted that a similar process may be followed with respect to a change in a trust designation of access network 190. For example, a trusted link may be established between eNodeB 191 and SeGW 137. However, upon detection of a security event associated with access network 190 and/or eNodeB 191, an untrusted link may be set up between eNodeB 191 and SeGW 137, and a secure tunnel may be established between SeGW 137 and endpoint device 162 such that payload traffic transported via the secure tunnel is indecipherable to eNodeB 191 or other base station equipment within access network 190. In addition, the trusted link may be torn down, certain network services may or may not be restricted for endpoint device 162, the trusted link between eNodeB 191 and SeGW 137 may be reestablished upon detection of a resolution of the security event, and so forth.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, SeGW 137, shared gateway 131 and SGW 134 may be combined into a single component. Alternatively, or in addition, AS 135 may be integrated with any one or more of such components. In still another example, AS 135 may be combined with AAA 133 and/or HSS 136. In addition, various elements of eUTRAN 120, EPC network 130, and IMS core network 150 may be omitted for clarity, including gateways or border elements providing connectivity between such networks. Similarly, due to the relatively large number of connections available between devices in the system 100, various links between AS 135, shared gateway 131, SeGW 137, MME 132, SGW 134, AAA server 133, HSS 136, eNodeBs 121 and 122, PDN GW 138, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). Similarly, although the shared gateway 131, AS 135, HSS 136, AAA server 133, and SeGW 137 are illustrated as components within EPC network 130 having a particular configuration, in other examples, any one or more of these components may be deployed in a different configuration. For example, HSS 136 and/or AAA server 133 may be deployed in IMS core network 150, SeGW 137 may reside external to EPC network 130 within LTE network 110, and so on. Thus, these and other modifications are all contemplated within the scope of the present disclosure.

Figure 2:
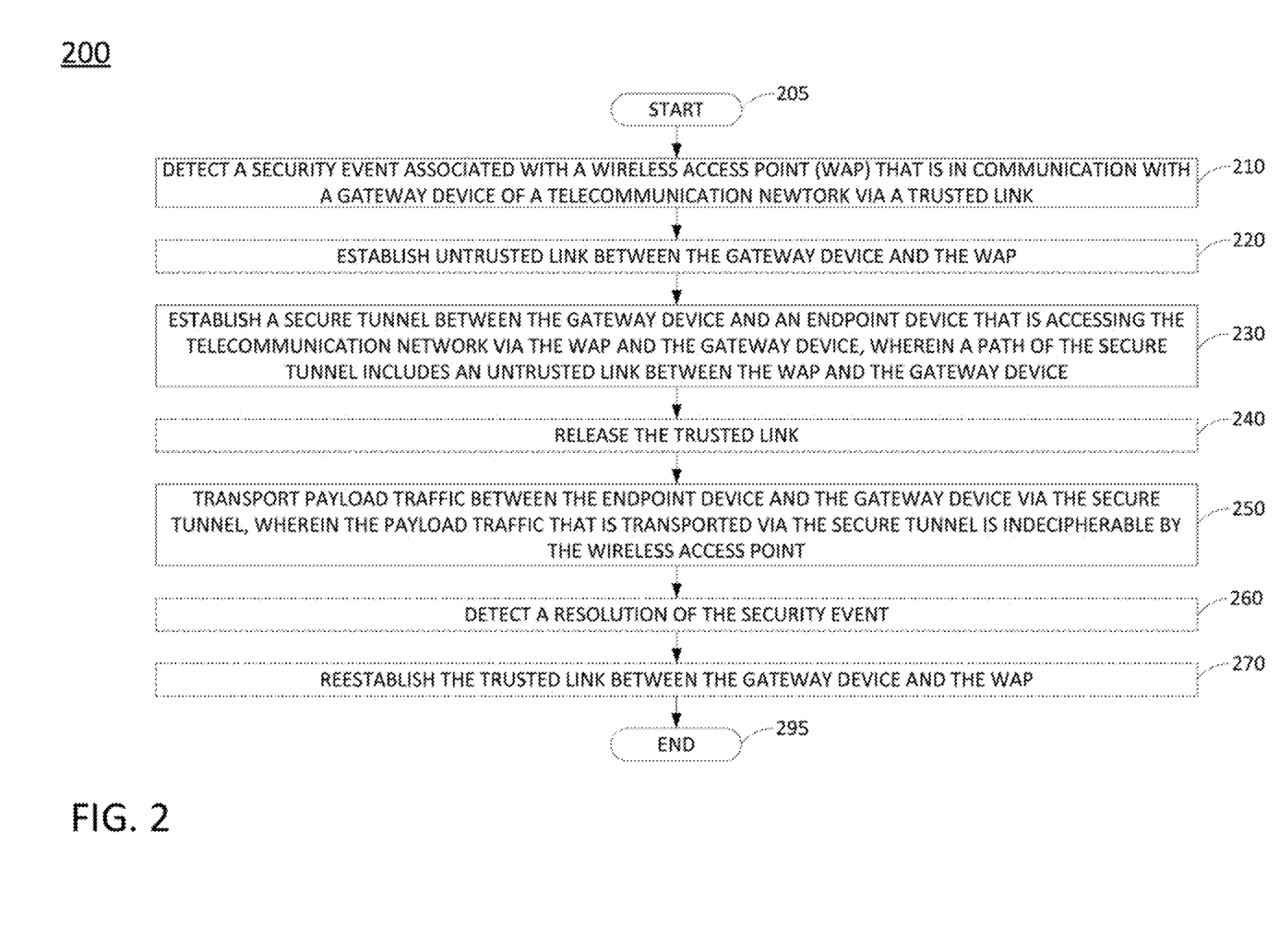
FIG. 2 illustrates a flowchart of an example method for establishing a secure tunnel having a path that includes an untrusted link between a wireless access point and a gateway device.

FIG. 2 illustrates a flowchart of an example method 200 for establishing a secure tunnel having a path that includes an untrusted link between a wireless access point and a gateway device, in accordance with the present disclosure. In one example, steps, functions and/or operations of the method 200 may be performed by a network-based device, e.g., a gateway device such as shared gateway 131, SeGW 137, or SGW 134 in FIG. 1, or a gateway device in conjunction with other components of the system 100 such as AS 135, AAA 133, HSS 136, and so on. In one example, the steps, functions, or operations of method 200 may be performed by a computing device or system 300, and/or processor 302 as described in connection with FIG. 3 below. For example, the system 300 may represent a gateway device, in accordance with the present disclosure. For illustrative purposes, the method 200 is described in greater detail below in connection with an example performed by a processor, such as processor 302. The method begins in step 205 and proceeds to step 210.

At step 210, the processor detects a security event associated with a wireless access point (WAP) that is in communication with a gateway device of a telecommunication network via a trusted link. The trusted link may comprise an IPsec tunnel, for example. In one example, the trusted link may comprise an S2a interface. The security event may comprise, for example, an invalidity of a security certificate of the WAP, a detection of a physical tampering at the WAP, or a detection of a port opening at the WAP. The security event may be detected in a number of ways, such as receiving a notification from a security device, e.g., a firewall, an SeGW, or the like, by the processor detecting an expiration of an IKE key of the WAP, via a message from the WAP itself, and so on.

The WAP may comprise, for example, a wireless router, e.g., an IEEE 802.11/Wi-Fi router, or an eNodeB, e.g., a HeNB, a picocell, a femtocell, or the like. In one example, the WAP is deployed in a peer network of the telecommunication network. In another example, the WAP is deployed in a network of a customer of the telecommunication network. In one example, the telecommunication network may comprise an EPC network. In one example, the gateway device comprises an evolved packet data gateway, a trusted wireless local area network authentication, authorization, and accounting proxy, and a trusted wireless local area network access gateway (e.g., collectively a "shared gateway"). In another example, the gateway device may alternatively or additionally comprise a serving gateway (SGW) and/or a security gateway (SeGW). Following step 210, the method 200 may proceed to step 230 or to optional step 220.

At optional step 220, the processor may establish an untrusted link between the gateway device and the WAP, e.g., in response to detecting the security event at step 210. The untrusted link may comprise, for example, an S2b interface.

At step 230, the processor establishes a secure tunnel between the gateway device and an endpoint device that is accessing the telecommunication network via the WAP and the gateway device, where the path of the secure tunnel includes the untrusted link between the WAP and the gateway device. In one example, the secure tunnel comprises an IPsec tunnel. For instance, the secure tunnel may comprise a SWu interface. Following step 230, the method 200 may proceed to step 250 or to optional step 240.

At optional step 240, the processor releases the trusted link. For instance, since the WAP is no longer trusted, the gateway device may receive communications for one or more endpoint devices serviced by the WAP via secure tunnels with the one or more endpoint devices over the untrusted link with the WAP. Accordingly, the trusted link may no longer be utilized and may be released. In particular, closing the trusted link may guarantee that malicious communications will not be received via the trusted link.

At step 250, the processor transports payload traffic between the endpoint device and the gateway device via the secure tunnel. Notably, while the WAP and the untrusted link remain in the path of the secure tunnel, the payload traffic that is transported via the secure tunnel is indecipherable by the WAP while in transit. Following step 250, the method 200 may proceed to step 295 or to optional step 260 or optional step 270.

At optional step 260, the processor may detect a resolution of the security event. The resolution of the security event may be detected in a number of ways, such as receiving a notification from a security device, e.g., a firewall, an SeGW, or the like, by the processor detecting a presentation of a new, valid IKE key of the WAP, via a message from the WAP itself, and so on.

At optional step 270, the processor may reestablish the trusted link between the gateway device and the WAP, e.g., in response to detecting the resolution of the security event. For example, the trust designation of the WAP may be elevated from "untrusted" back to "trusted" when the resolution of the security event is detected. In addition, the processor may then determine that it is acceptable to again treat the WAP and communications therefrom as trusted. Thus, at optional step 270, the trusted link may be reestablished and traffic for the endpoint device (and for other endpoint devices connected to gateway device via the WAP) may be transitioned back to the trusted link. Following step 270, the method may proceed to step 295. At step 295, the method 200 ends.

It should be noted that the method 200 may be expanded to include additional steps. For instance, in one example, the processor may also establish the trusted link prior to the operations of step 210. In one example, the processor may make unavailable at least one service provided by the telecommunication network to the endpoint device when the secure tunnel is established between the gateway device and the endpoint device. Similarly, when the trusted link is reestablished the processor may also provide or make available to the endpoint device one or more services previously made unavailable to the endpoint device. In another example, when the WAP is in communication with the gateway device via the trusted link, the processor may receive monitoring data, e.g., OA&M data, from the WAP. In still another example, following optional step 270 the processor may release the untrusted link. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Figure 3:
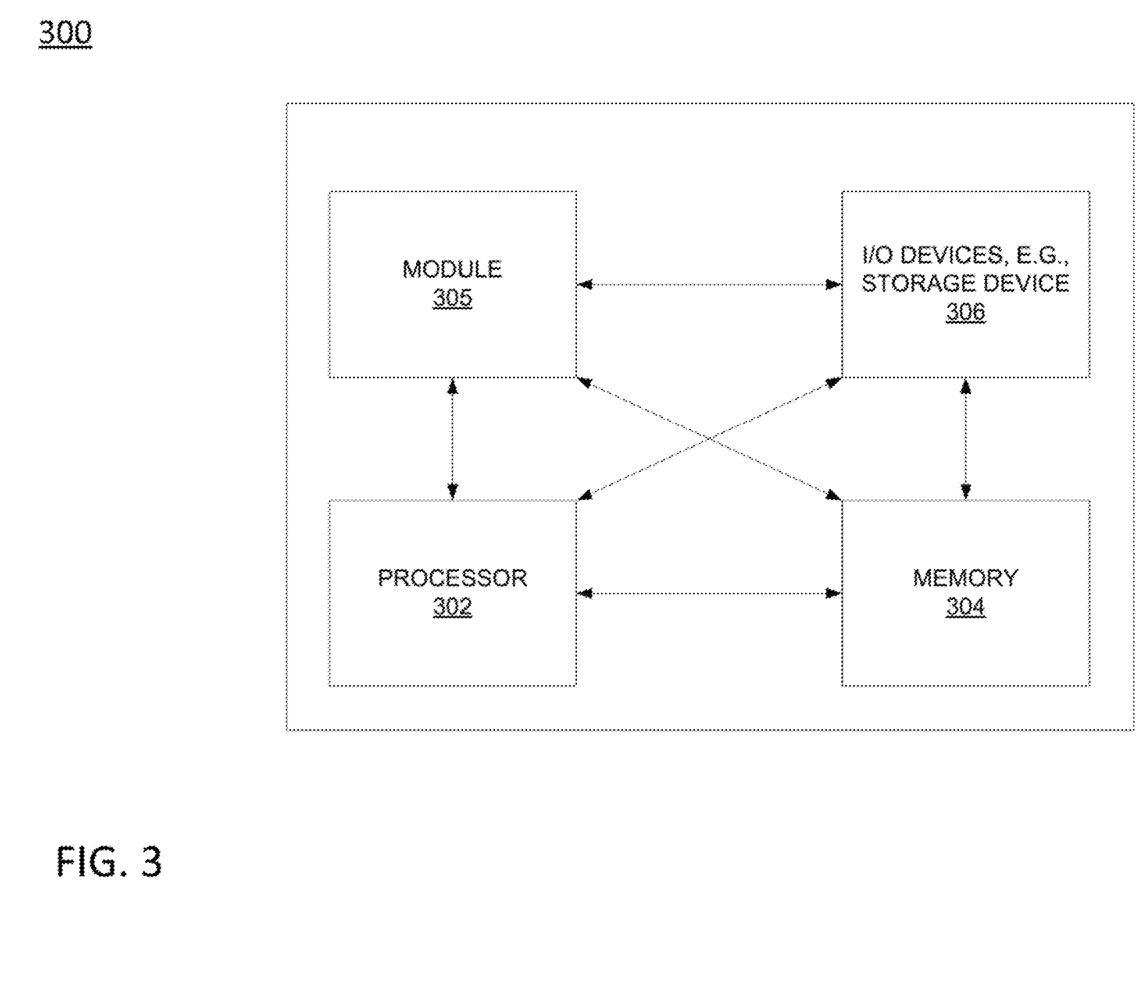
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for establishing a secure tunnel having a path that includes an untrusted link between a wireless access point and a gateway device, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for establishing a secure tunnel having a path that includes an untrusted link between a wireless access point and a gateway device (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for establishing a secure tunnel having a path that includes an untrusted link between a wireless access point and a gateway device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A gateway device deployed in a telecommunication network, the gateway device comprising:
 a processor; and
 a computer-readable medium storing instructions which, when executed by the processor, cause the processor to perform operations, the operations comprising:
  detecting a change in a trust designation of a wireless access point that is in communication with the gateway device via a trusted link, wherein the telecommunication network stores a plurality of trust designations of a plurality of wireless access points including the wireless access point, and wherein the wireless access point processes first payload traffic to and from an endpoint device via the trusted link;
  establishing, in response to the change in the trust designation of the wireless access point, a secure tunnel between the gateway device and the endpoint device that is accessing the telecommunication network via the wireless access point and the gateway device, wherein a path of the secure tunnel includes an untrusted link between the wireless access point and the gateway device; and
  transporting, in response to the establishing, the payload traffic between the endpoint device and the gateway device via the secure tunnel, wherein the payload traffic that is transported via the secure tunnel is indecipherable by the wireless access point.

2. The gateway device of claim 1, wherein the wireless access point comprises a wireless router.

3. The gateway device of claim 1, wherein the wireless access point comprises an eNodeB.

4. The gateway device of claim 1, wherein the wireless access point is deployed in a peer network of the telecommunication network.

5. The gateway device of claim 1, wherein the wireless access point is deployed in a network of a customer of the telecommunication network.

6. The gateway device of claim 1, wherein the gateway device comprises a serving gateway.

7. The gateway device of claim 1, wherein the gateway device comprises a security gateway.

8. The gateway device of claim 1, wherein the gateway device comprises, an evolved packet data gateway, a trusted wireless local area network authentication, authorization, and accounting proxy, and a trusted wireless local area network access gateway.

9. The gateway device of claim 1, wherein the telecommunication network comprises an evolved packet core network.

10. The gateway device of claim 1, wherein at least one service provided by the telecommunication network to the endpoint device is made unavailable when the secure tunnel is established between the gateway device and the endpoint device.

11. The gateway device of claim 1, wherein the trusted link and the secure tunnel comprise internet protocol security tunnels.

12. The gateway device of claim 1, wherein the change in the trust designation comprises a change from a trusted designation to an untrusted designation.

13. The gateway device of claim 1, wherein when the wireless access point is in communication with the gateway device via the trusted link, the telecommunication network receives monitoring data from the wireless access point that is associated with an access network of the wireless access point.

14. The gateway device of claim 13, wherein the monitoring data comprises at least one of: operations data, administration data, management data or maintenance data.

15. The gateway device of claim 1, wherein the operations further comprise:
 releasing the trusted link, wherein the wireless access point remains in communication with the gateway device via the untrusted link.

16. The gateway device of claim 15, wherein the operations further comprise:
  detecting a reversal of the change in the trust designation; and
  reestablishing the trusted link between the gateway device and the wireless access point.

17. The gateway device of claim 16, wherein at least one service of the telecommunication network that is made unavailable to the endpoint device when the secure tunnel is established is provided to the endpoint device by the telecommunication network when the trusted link is reestablished.

18. The gateway device of claim 1, wherein the operations further comprise:
  establishing the untrusted link between the gateway device and the wireless access point.

19. A non-transitory computer-readable medium storing instructions which, when executed by a processor of a gateway device deployed in a telecommunication network, cause the processor to perform operations, the operations comprising:
  detecting a change in a trust designation of a wireless access point that is in communication with the gateway device via a trusted link, wherein the telecommunication network stores a plurality of trust designations of a plurality of wireless access points including the wireless access point, and wherein the wireless access point processes first payload traffic to and from an endpoint device via the trusted link;
  establishing, in response to the change in the trust designation of the wireless access point, a secure tunnel between the gateway device and the endpoint device that is accessing the telecommunication network via the wireless access point and the gateway device, wherein a path of the secure tunnel includes an untrusted link between the wireless access point and the gateway device; and
  transporting, in response to the establishing, the payload traffic between the endpoint device and the gateway device via the secure tunnel, wherein the payload traffic that is transported via the secure tunnel is indecipherable by the wireless access point.

20. A method comprising:
detecting, by a processor of a gateway device deployed in a telecommunication network, a change in a trust designation of a wireless access point that is in communication with the gateway device via a trusted link, wherein the telecommunication network stores a plurality of trust designations of a plurality of wireless access points including the wireless access point, and wherein the wireless access point processes first payload traffic to and from an endpoint device via the trusted link;
establishing, by the processor, in response to the change in the trust designation of the wireless access point, a secure tunnel between the gateway device and the endpoint device that is accessing the telecommunication network via the wireless access point and the gateway device, wherein a path of the secure tunnel includes an untrusted link between the wireless access point and the gateway device; and
transporting, by the processor, in response to the establishing, the payload traffic between the endpoint device and the gateway device via the secure tunnel, wherein the payload traffic that is transported via the secure tunnel is indecipherable by the wireless access point.

* * * * *